(12) United States Patent
Miyamoto et al.

(10) Patent No.: US 10,227,685 B2
(45) Date of Patent: Mar. 12, 2019

(54) METHOD OF FORMING A SPRAYED IRON COATING AND COATED MEMBER

(71) Applicant: TOYOTA JIDOSHA KABUSHIKI KAISHA, Toyota-shi, Aichi-ken (JP)

(72) Inventors: Noritaka Miyamoto, Toyota (JP); Masaki Hirano, Tsushima (JP); Tomoko Kozaki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 358 days.

(21) Appl. No.: 15/023,925

(22) PCT Filed: Sep. 18, 2014

(86) PCT No.: PCT/IB2014/001865
§ 371 (c)(1),
(2) Date: Mar. 22, 2016

(87) PCT Pub. No.: WO2015/044735
PCT Pub. Date: Apr. 2, 2015

(65) Prior Publication Data
US 2016/0237543 A1    Aug. 18, 2016

(30) Foreign Application Priority Data
Sep. 24, 2013    (JP) .................................. 2013-196409

(51) Int. Cl.
*C23C 4/02* (2006.01)
*C23C 4/131* (2016.01)
(Continued)

(52) U.S. Cl.
CPC ............ *C23C 4/131* (2016.01); *B32B 15/011* (2013.01); *B32B 15/012* (2013.01); *C23C 4/02* (2013.01);
(Continued)

(58) Field of Classification Search
CPC .................................... C23C 2/02; C23C 4/16
(Continued)

(56) References Cited

U.S. PATENT DOCUMENTS 5,592,927 A    1/1997    Zaluzec et al.
5,820,938 A *  10/1998   Pank .......................... C23C 2/02
                                                          427/449

(Continued)

FOREIGN PATENT DOCUMENTS

DE    19637 737 A1    4/1997
DE    102008053642 A1    5/2010
(Continued)

*Primary Examiner* — Khanh T Nguyen
(74) *Attorney, Agent, or Firm* — Sughrue Mion, PLLC

(57) ABSTRACT

A method for forming an iron sprayed coating on a substrate with droplets of a wire molten by an electric arc includes: a step of forming a first iron sprayed coating on the substrate, the wire for arc spraying being a first wire containing iron and 0.03 to 0.10% by mass of carbon and the compressed gas being inert gas; and a step of forming a second iron sprayed coating on the first iron sprayed coating, the wire for arc spraying being a second wire containing iron and 0.03 to 0.10% by mass of carbon and the compressed gas containing 10 to 21% by volume of oxygen gas.

10 Claims, 15 Drawing Sheets

(51) Int. Cl.
     *C23C 4/08*     (2016.01)
     *B32B 15/01*     (2006.01)
     *C23C 4/06*     (2016.01)
     *F02F 1/00*     (2006.01)
     *C22C 38/02*     (2006.01)
     *C22C 38/04*     (2006.01)

(52) U.S. Cl.
     CPC .................. *C23C 4/06* (2013.01); *C23C 4/08* (2013.01); *F02F 1/004* (2013.01); *C22C 38/02* (2013.01); *C22C 38/04* (2013.01)

(58) Field of Classification Search
     USPC ........................................ 427/449; 219/76.12
     See application file for complete search history.

(56) References Cited

U.S. PATENT DOCUMENTS 5,958,521 A * 9/1999 Zaluzec .................... C23C 4/16
     219/76.12
8,082,768 B2   12/2011  Hidaka et al.
2010/0108014 A1   5/2010  Kodama et al.

FOREIGN PATENT DOCUMENTS

| | | |
|---|---|---|
| JP | 2008-240029 A | 10/2008 |
| JP | 2009-155720 A | 7/2009 |
| JP | 2010-275581 A | 12/2010 |
| JP | 2012-041617 A | 3/2012 |

* cited by examiner

THE SIZE PER
PARTICLE IS LARGE

THE SIZE PER
PARTICLE IS SMALL

FIG. 22A
FIG. 22B
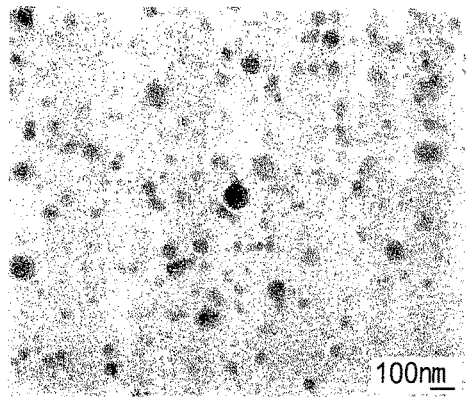
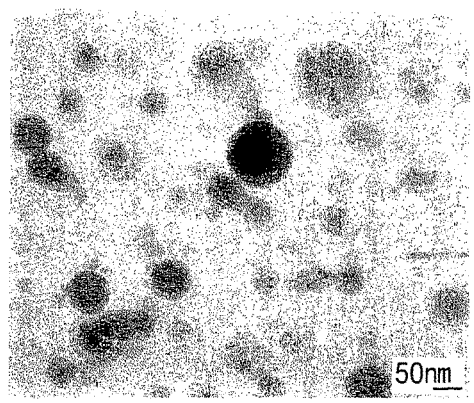
FIG. 22C
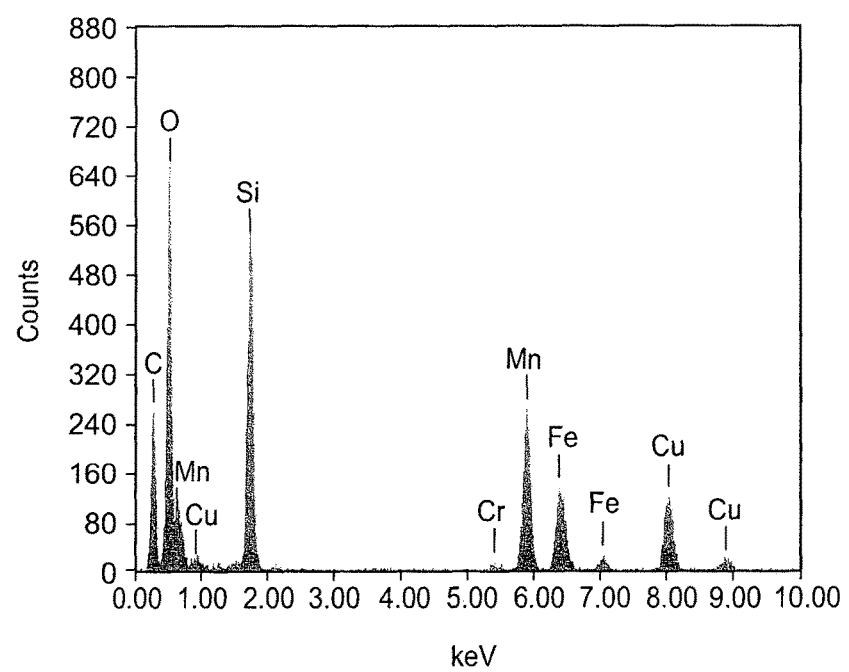

METHOD OF FORMING A SPRAYED IRON COATING AND COATED MEMBER

CROSS REFERENCE TO RELATED APPLICATIONS

This application is a National Stage of International Application No. PCT/IB2014/001865 filed Sep. 18, 2014, claiming priority based on Japanese Patent Application No. 2013-196409 filed Sep. 24, 2013, the contents of all of which are incorporated herein by reference in their entirety.

BACKGROUND OF THE INVENTION

1. Field of the Invention

The invention relates to a method for forming an iron sprayed coating formed with a wire for arc spraying by melting the wire for arc spraying by means of an electric arc and spraying the molten wire for arc spraying to a substrate while supplying compressed gas to the molten wire, and to a member with the iron sprayed coating which includes a substrate coated with the iron sprayed coating.

2. Description of Related Art

Internal surfaces of cylinder bores of cylinder blocks are coated with sprayed coatings formed by the spraying technique involving instantaneous melting of various metals or alloy metals by means of flames generated with an arc, plasma or gas and allowing collision/solidification and attachment of the sprayed particles atomized (rendered to be fine particles) by means of compressed gas, in order to improve corrosion resistance, wear resistance and the like of the internal surfaces of the bores.

For example, Japanese Patent Application Publication No. 2009-155720 (JP 2009-155720 A) discloses an exemplary technique of a method for forming a sprayed coating by plasma spraying using a material containing 0.12% by mass or more of carbon. For example, Japanese Patent Application Publication No. 2010-275581 (JP 2010-275581 A) discloses a method for forming a sprayed coating containing, in mass ratio, 0.3 to 0.4% of C, 0.2 to 0.5% of Si, 0.3 to 1.5% of Mn and 0.5% or less of Cr and/or Mo in total with the balance being Fe and unavoidable impurities.

Although use of materials containing an increased amount of carbon as JP 2009-155720 A and JP 2010-275581 A may improve wear resistance of the sprayed coatings, it may also decrease machinability of the sprayed coatings. When arc spraying is carried out with wires for arc spraying containing an increased amount of carbon, the strength of the wires themselves may be improved, thereby decreasing the productivity.

With the above in mind, Japanese Patent Application Publication No. 2008-240029 (JP 2008-240029 A) discloses a method for forming a sprayed coating using a wire for arc spraying containing a main component of Fe, 0.01 to 0.2% by weight of C and 0.25 to 1.7% by weight of Si. In this method, the sprayed coating is formed by melting the wire for arc spraying by means of an electric arc and spraying the molten wire for arc spraying on a substrate while supplying compressed air to the molten wire.

However, the method of forming a coating disclosed in JP 2008-240029 A may result in a decreased adhesion strength between the sprayed coating and the substrate because spraying is carried out with air containing oxygen. Specifically, use of oxygen-containing gas results in attachment on the substrate of not only the iron oxide that forms the coating but also fine iron oxide dust. The presence of the attached substances on the substrate between the coating and the substrate is considered to decrease the metallic attachment or anchor effect between the coating and the substrate. This phenomenon is more significantly manifested when spraying is carried out using the materials disclosed in JP 2009-155720 A and JP 2010-275581 A.

SUMMARY OF THE INVENTION

The invention provides a method for forming an iron sprayed coating having an increased adhesion strength with a substrate, and a member coated with the iron sprayed coating.

The inventors have, as a result of exhaustive studies, focused on the droplets of the molten wire for arc spraying during arc spraying. Specifically, the inventors thought that when finely atomized droplets of the molten wire for arc spraying are attached on a substrate, the droplets are cooled before the droplets reach to the surface of the substrate (while the droplets are flying), resulting in a reduction in physical adsorption between the substrate and the droplets at the time of collision and reduction in the rate of the attachment between the metals.

Thus the inventors took the viscosity and surface tension of the droplets into account. Specifically, the inventors thought that in order to attach larger droplets onto a substrate, it is important to increase the viscosity of the droplets and the surface tension of the droplets. Thus the inventors have defined the amount of carbon added to iron in order to increase the viscosity of the droplets, and defined compressed gas through which the droplets fly in order to increase the surface tension of the droplets.

The first aspect of the invention relates to a method for forming an iron sprayed coating on a substrate with droplets of a molten wire for arc spraying that are prepared by melting a wire for arc spraying by means of an electric arc and spraying the molten wire on the substrate while supplying compressed gas to the molten wire. The method includes: a step of forming a first iron sprayed coating on the substrate using a first wire containing iron and 0.03 to 0.10% by mass of carbon as the wire for arc spraying and an inert gas as the compressed gas; and a step of forming a second iron sprayed coating on the first iron sprayed coating, using a second wire containing iron and 0.03 to 0.10% by mass of carbon as the wire for arc spraying and a gas containing 10 to 21% by volume of oxygen gas as the compressed gas.

According to the invention, in the step of forming the first iron sprayed coating first of all, the first iron sprayed coating is formed on the substrate with the wire for arc spraying which is the first wire containing iron and 0.03 to 0.10% by mass of carbon and the compressed gas which is inert gas. Accordingly larger droplets (droplets of the molten first wire) in which the amount of oxides produced is reduced can be attached on the substrate.

Namely use of the wire for arc spraying which is low-carbon-containing steel containing iron and 0.03 to 0.10% by mass of carbon can increase the viscosity of the droplets of the molten first wire and in addition, use of inert gas can increase the surface tension of the droplets departed and flying from a solution. Accordingly droplets which are coarser than conventional droplets can stably fly from the first wire towards the substrate under an environment with reduced production of oxides and thus the droplets having an increased amount of heat as a part of the iron sprayed coating are allowed to collide with the substrate. As a result, the physical adsorption between the substrate and the iron sprayed coating as well as the rate of the metallic attachment therebetween can be increased, thereby increasing the adhesiveness of the iron sprayed coating to the substrate.

A first wire containing less than 0.03% by mass of carbon cannot have sufficient hardness (strength), while the first wire containing more than 0.10% by mass of carbon may have insufficient viscosity, causing collision of fine droplets as a part of an iron sprayed coating to the substrate and resulting in an insufficient adhesion strength.

Next, in the step of forming the second iron sprayed coating, the second iron sprayed coating is formed on the first iron sprayed coating with the wire for arc spraying which is the second wire containing iron and 0.03 to 0.10% by mass of carbon and compressed gas which contains 10 to 21% by volume of oxygen gas.

Use of the compressed gas which contains 10 to 21% by volume of oxygen gas allows a decrease in surface tension of the droplets (droplets of the molten second wire) departed and flying from a solution compared to that of the molten droplets obtained with compressed gas which is inert gas. Accordingly the size of the droplets can be decreased while oxidation of some of the droplets can be facilitated. The obtained second iron sprayed coating can be an iron sprayed coating formed with fine particles containing a higher amount of oxides than the first iron sprayed coating, thereby resulting in the iron sprayed coating having increased sliding properties compared to the case where only the first iron sprayed coating is contained.

A second wire containing less than 0.03% by mass of carbon cannot have sufficient strength, while a second wire containing more than 0.10% by mass of carbon may inhibit machinability of the coating because of the high amount of carbon. In addition, compressed gas containing less than 10% by volume of oxygen gas may not provide a sufficient amount of oxides to an iron sprayed coating, while compressed gas containing more than 20% by volume of oxygen gas may not any more provide improvements in the effects.

The first iron sprayed coating is formed with, as described above, coarse droplets and thus has a surface roughness that is greater than the conventional iron sprayed coatings and general undercoated surfaces. Thus even when some droplets of the molten second wire are oxidized, the adhesion strength of the second iron sprayed coating can be secured due to the anchor effect resulting from the surface roughness of the first iron sprayed coating.

The first and second wires which are wires for arc spraying containing iron and 0.03 to 0.10% by mass of carbon may be different or the same. When the same wire is used as the first and second wires, the first and second iron sprayed coatings can be continuously formed by changing the compressed gas from inert gas to gas containing 10 to 21% by volume of oxygen gas.

The second wire may further contain 0.8 to 2.2% by mass of manganese and 0.9 to 1.5% by mass of silicon, and the second iron sprayed coating may be formed while supplying the compressed gas so that the droplets of the molten second wire has a flying speed of 70 m/sec or more.

When the second iron sprayed coating is formed under the conditions, the second iron sprayed coating contains nano-sized oxide spheres containing manganese and silicon. As a result, because of the nano-sized oxide spheres therein the second iron sprayed coating may have further improved scuffing resistance and wear resistance compared to an iron sprayed coating containing iron oxide so as to improve scuffing resistance and wear resistance.

When the droplets have a flying speed of less than 70 m/sec, the oxide spheres containing manganese and silicon may not be obtained. When the amount of manganese is below the range described above, the amount of the oxide spheres obtained may not be sufficient, and when the amount of manganese is higher than the range described above, spraying properties may be deteriorated (an incidence of sputtering may be increased). When the amount of silicon is below the range described above, the oxide spheres may not be obtained, and when the amount of silicon is higher than the range described above, spraying properties may be deteriorated.

A second aspect of the invention relates to a coated member comprises a substrate, a first iron sprayed coating formed on the substrate and a second iron sprayed coating formed on the first iron sprayed coating. The first iron sprayed coating includes a carbon content of 0.07% by mass or less. The second iron sprayed coating includes a carbon content of 0.07% by mass or less and an oxygen content that is higher than an oxygen content of the first iron sprayed coating. A crystal particle diameter of the second iron sprayed coating is smaller than a crystal particle diameter of the first iron sprayed coating, According to the invention, machinability can be improved because the carbon content of the first iron sprayed coating and the second iron sprayed coating that is 0.07% by mass or less. The second iron sprayed coating has an oxygen content that is higher than that of the first iron sprayed coating and the first iron sprayed coating has a crystal particle diameter that is larger than that of the second iron sprayed coating, resulting in improved scuffing resistance and wear resistance of the second iron sprayed coating compared to the first iron sprayed coating and increased adhesion of the first iron sprayed coating to the substrate.

The second iron sprayed coating may further contain oxide spheres containing manganese and silicon. The second iron sprayed coating containing the oxide spheres may have further improved scuffing resistance and wear resistance.

According to the invention, the iron sprayed coating having an improved adhesion strength to a substrate can be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 22A and 22B show the results of TEM observation of the coating formed with the atomization gas flow rate of 900 L/min in Example 3, and FIG. 22C is a graph showing the result of EDX analysis of the particles in the coating.

DETAILED DESCRIPTION OF EMBODIMENTS

Figure 1:
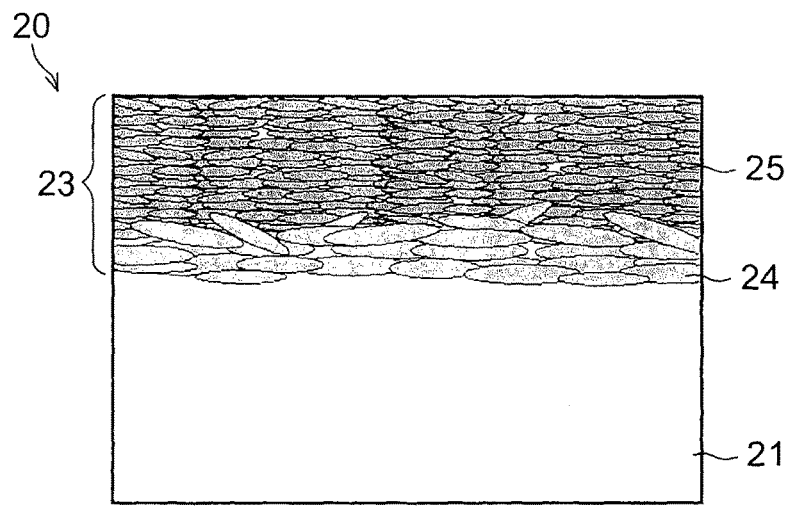
FIG. 1 is a schematic conceptual diagram of a member coated with an iron sprayed coating according to an embodiment of the invention.
Figure 2:
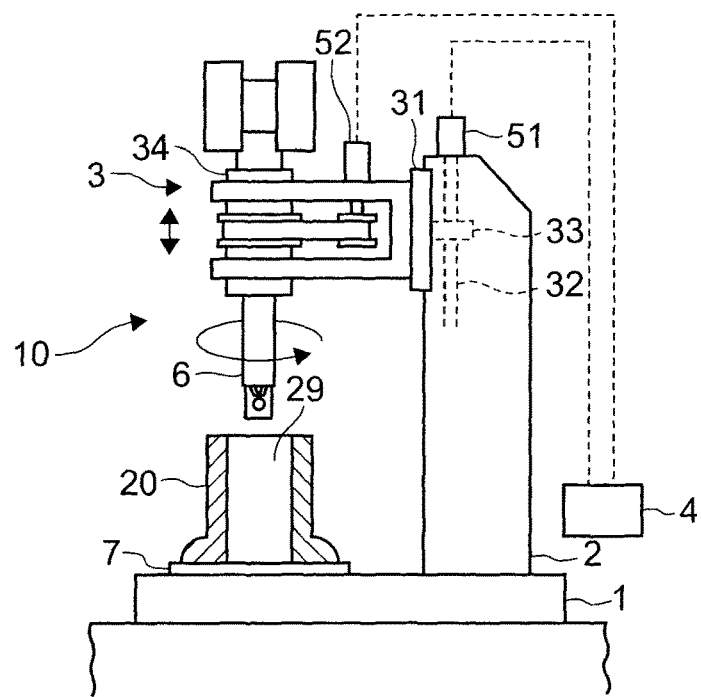
FIG. 2 is a schematic diagram showing a spraying device.
Figure 3:
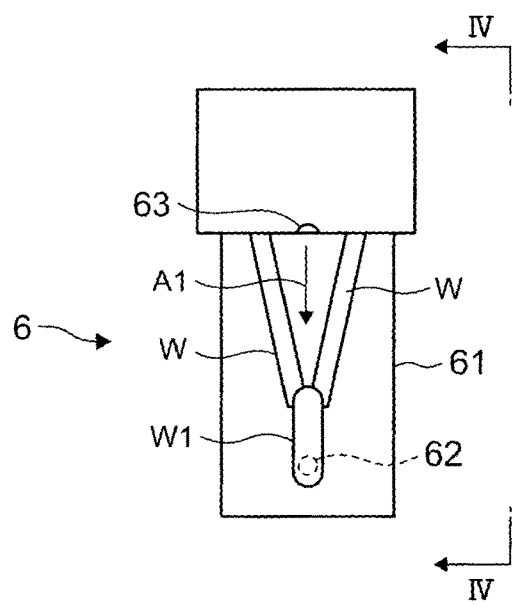
FIG. 3 is an enlarged view of a spraying gun.
Figure 4:
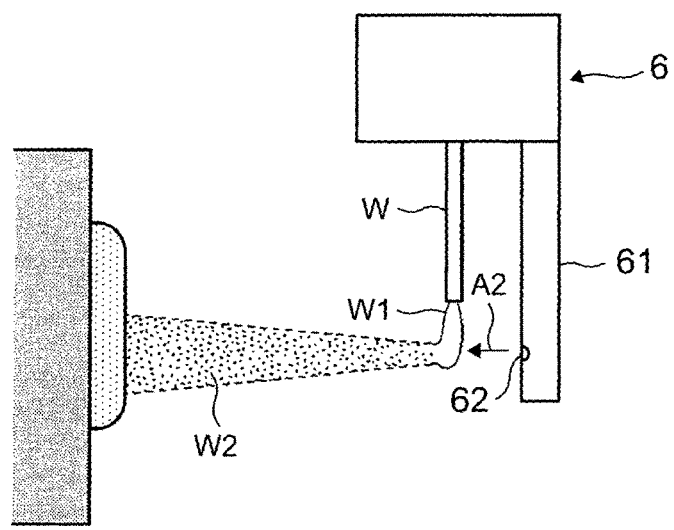
FIG. 4 is an arrow view taken along line IV-IV of FIG. 3.
Figure 5:
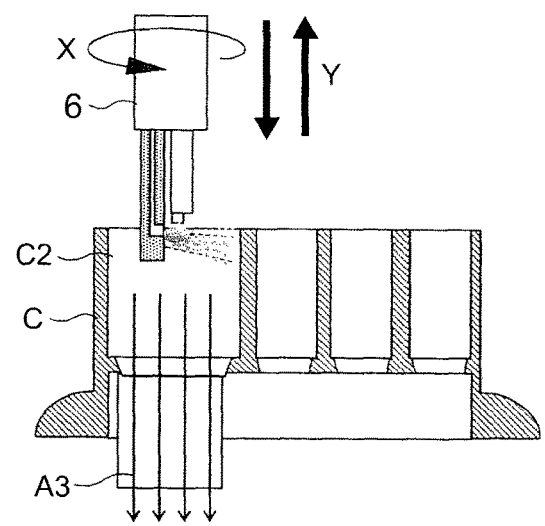
FIG. 5 is a schematic conceptual diagram illustrating a method for forming an iron sprayed coating on an inner surface of a cylinder bore with the spraying device shown in FIG. 2.

FIG. 1 is a schematic conceptual diagram of a member coated with an iron sprayed coating according to an embodiment of the invention. FIG. 2 is a schematic diagram showing a spraying device. FIG. 3 is an enlarged view of a spraying gun. FIG. 4 is an arrow view taken along line IV-IV of FIG. 3. FIG. 5 is a schematic conceptual diagram illustrating a method for forming an iron sprayed coating on an inner surface of a cylinder bore with the spraying device shown in FIG. 2.

As shown in FIG. 1, a member 20 coated with an iron sprayed coating according to the embodiment contains a substrate 21 which is coated with an iron sprayed coating 23 by arc spraying. The substrate 21 may include aluminium alloy castings such as JIS: AC2C and ADC12. The material of the substrate 21 is not particularly limited as far as it allows formation of the iron sprayed coating described hereinbelow and may be a metal member such as iron materials including steel and cast iron or wrought aluminium.

The iron sprayed coating 23 includes a first iron sprayed coating 24 formed on the substrate 21 and a second iron sprayed coating 25 formed on the first iron sprayed coating 24. The first iron sprayed coating 24 and the second sprayed coating 25 respectively has a carbon content of 0.07% by mass or less and the second iron sprayed coating 25 has an oxygen content that is higher than that of the first iron sprayed coating 24.

More specifically, the first iron sprayed coating 24 is a coating containing iron, at least 0.015 to 0.063% by mass of carbon and 0.1 to 1% by mass oxygen. The second iron sprayed coating 25 is preferably a coating containing iron, at least 0.008 to 0.070% by mass of carbon and 1 to 5% by mass of oxygen. The first iron sprayed coating 24 has a crystal particle diameter of 129 μm or more and the first iron sprayed coating 24 has a crystal particle diameter that is larger than that of the second iron sprayed coating 25.

By decreasing the carbon contents in the first iron sprayed coating 24 and the second iron sprayed coating 25 as above, the iron sprayed coating 23 can have improved machinability. The second iron sprayed coating 25 has an oxygen content that is higher than that of the first iron sprayed coating 24, and thus the second iron sprayed coating 25 has higher hardness than the first iron sprayed coating 24. The second iron sprayed coating 25 has a crystal particle diameter that is smaller than that of the first iron sprayed coating 24, and thus the second iron sprayed coating 25 is denser than the first iron sprayed coating 24. Thus the second iron sprayed coating 25 can have improved scuffing resistance and wear resistance compared to the first iron sprayed coating 24.

The first iron sprayed coating 24 can have a higher crystal particle diameter than that of the second iron sprayed coating 25, and thus not only the adhesiveness of the first iron sprayed coating 24 to the substrate 21 due to the anchor effect of the first iron sprayed coating 24 but also the adhesiveness of the second iron sprayed coating 25 to the first iron sprayed coating 24 can be increased.

The second iron sprayed coating 24 contains oxide spheres containing manganese and silicon and having a particle diameter of 10 to 200 nm. Because of the oxide spheres included in the second iron sprayed coating 24, scuffing resistance and wear resistance can be further improved.

FIG. 2 is a schematic diagram of an embodiment of a spraying device used for formation of the iron sprayed coating. This figure shows an example of a device that sprays to an inner surface of a cylindrical substrate 20. The spraying device 10 generally includes a stage 1; a supporting member 2 fixed onto the stage 1; a spraying tool 3 which moves up and down along the supporting member 2; a spraying gun 6 attached at a tip of the spraying tool 3; a controller 4; and a pallet 7 onto which the substrate 20 is mounted and fixed.

The supporting member 2 is provided on the stage 1 and supports a slider 31 included in the spraying tool 3 so that the slider 31 can freely ascend and descend. The controller 4 is connected to a descend/ascend driving motor 51 and a rotation driving motor 52 which are attached at the upper portion of the supporting member 2. The descend/ascend driving motor 51 contains a spiral screw 32 attached to an axis of rotation of the driving motor 51 and the spiral screw 32 is screwed with a support 33 fixed to the slider 31. The controller 4 controls the rotation direction and rotation speed of the descend/ascend driving motor 51, so that the spraying tool 3 can ascend and descend at a desired speed by means of the rotation of the descend/ascend driving motor 51.

A tool main body 34 of the spraying tool 3 has the spraying gun 6 at the tip thereof, and the tool main body 34 and the spraying gun 6 rotate around the axes thereof by means of the rotation driving motor 52 (the direction Y in the figure). The pallet 7 is attached on the stage 1 and fixes the substrate 20 mounted thereon. When the tool main body 34 and the spraying gun 6 ascend and descend (the direction X in the figure) through a hollow portion 29 of the substrate 20 while rotating, particles are sprayed onto the inner surface of the hollow portion 29.

FIG. 3 is an enlarged view of the spraying gun 6 and FIG. 4 is a side view thereof. When the spraying device 10 carries out spraying, a power line (not shown) is energized, an arc is generated (electric arc) at the contact portion at the tips of wires for arc spraying (wires W), and the tips of the wires W are melted due to heat by means of the electric arc. The wires W are then drawn from a reel by means of the rotation of a supply roller (not shown) in order to complement the consumed portions. When gas is supplied to hose pipes (not shown), an auxiliary nozzle 63 sprays auxiliary gas A1 as well as an atomization nozzle 62 arranged on the tip member 61 of the spraying gun 6 sprays atomization gas A2 (see FIG. 4). FIG. 3 schematically shows the situation where the tips of the wires W are melted and the auxiliary nozzle 63 sprays compressed gas that is auxiliary gas A1.

As shown in FIG. 4, the atomization nozzle 62 then sprays the atomization gas A2 towards a molten droplet W1 to disperse the molten droplet W1 into fine sprayed particles W2. When, under this situation, the spraying gun 6 is rotated while the spraying tool 3 ascend or descend at a certain speed in the hollow portion 29 of the substrate 20, the sprayed particles W2 are sprayed on the inner surface of the hollow portion 29. The sprayed particles W2 attach to the inner surface of the hollow portion 29 to form the iron sprayed coating.

When, for example as shown in FIG. 5, spraying is carried out onto an inner surface of a bore C2 in a cylinder block C, the spraying gun 6 is inserted in the bore C2 from one end such that the spraying gun 6 ascends and descends therein while being rotated, and dust and fumes A3 are aspirated from the other end, thereby forming the iron sprayed coating on the inner surface of the bore C2.

Figure 6:
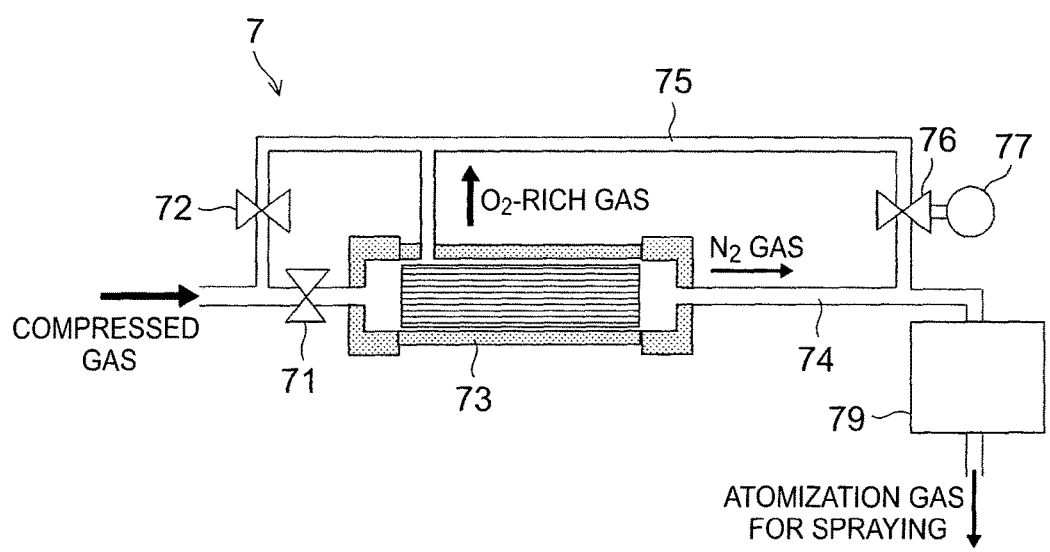
FIG. 6 is a schematic conceptual diagram of a gas supply device provided to a spraying device according to an embodiment of the invention.

Compressed gases (namely auxiliary gas A1 and atomization gas A2) supplied to the wires for arc spraying are provided from a gas supply device shown in FIG. 6. FIG. 6 is a schematic conceptual diagram of a gas supply device provided to the spraying device according to the embodiment of the invention.

As shown in FIG. 6, compressed air is supplied to the gas supply device 7 which includes a passage branched into two passages 74 and 75. Gas to be supplied to the spraying device 10 can be selected by controlling the operation of valves 71, 72 and 76.

The passage 75 is connected to the valve 76 in the vicinity of which a gas flowmeter 77 is arranged in order to measure the oxygen content. The passage 74 includes an oxygen adsorbent 73. In the embodiment, the gas absorbed to the oxygen adsorbent 73, i.e., oxygen gas (oxygen-rich gas) may flow through the passage 75. The oxygen gas content of the gas accumulated in an accumulator 79 can be adjusted by opening the valve 71 (closing the valve 72) and adjusting the amount of the opening of the valve 76 while measuring the flow rate with the flowmeter 77.

With the device shown in FIGS. 2 to 6, the iron sprayed coating 23 according to the embodiment is formed. Specifically, in order to form the coating, wires for arc spraying W are melted by means of an electric arc and compressed gas that is atomization gas A2 is supplied to the molten wires for arc spraying while spraying the atomization gas A2 towards the substrate 20 to form the iron sprayed coating 23 formed by the first iron sprayed coating 24 and the second wire for spraying 25 is formed on the substrate 20 with droplets W1 of the molten wires for arc spraying W.

The first iron sprayed coating 24 is first formed on the substrate 20. Specifically, the wires for arc spraying W used contain iron and 0.03 to 0.10% by mass of carbon with respect to 100% by mass of the wires for arc spraying W and compressed gas used is inert gas, whereby the first iron sprayed coating 24 is formed on the substrate 20.

The inert gas is supplied from the gas supply device 7 shown in FIG. 6. Specifically, the valve 71 shown in FIG. 6 is opened and valves 72 and 76 are closed. Accordingly, oxygen gas in compressed gas is adsorbed to the oxygen adsorbent 73, so that gas (nitrogen gas) having non-oxidizing property is produced for the molten wires for arc spraying (first wire for spraying). At this time, oxygen gas accumulated in the passage 75 may be exhausted through a relief valve. Although nitrogen gas is produced from air by removing oxygen gas in the embodiment, inert gas such as helium gas and argon gas may also be used as far as the molten wire for arc spraying is not oxidized.

By forming the first iron sprayed coating 24 as above, the droplets (droplets of the molten first wire for spraying) of a larger size containing a reduced amount of oxides produced can be attached on the substrate 21.

Figure 7:
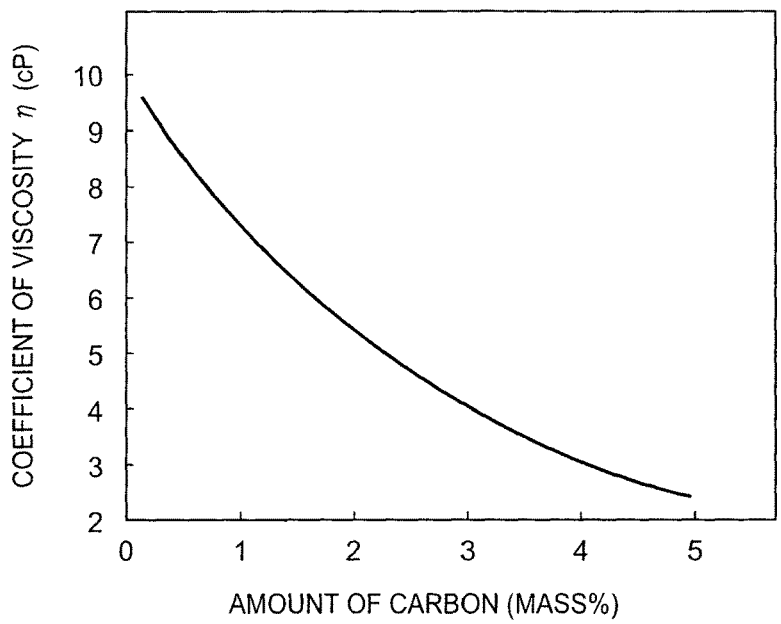
FIG. 7 is a conceptual diagram showing the correlation between the amount of carbon added to iron and the coefficient of viscosity.

As shown in FIG. 7, the viscosity of the droplets (molten metal) is decreased as the amount of carbon added to iron is increased. In the embodiment, the droplets of the molten first wire for spraying can have an increased viscosity when the wire for arc spraying is a low-carbon-containing steel containing iron and 0.03 to 0.10% by mass of carbon.

Figure 8:
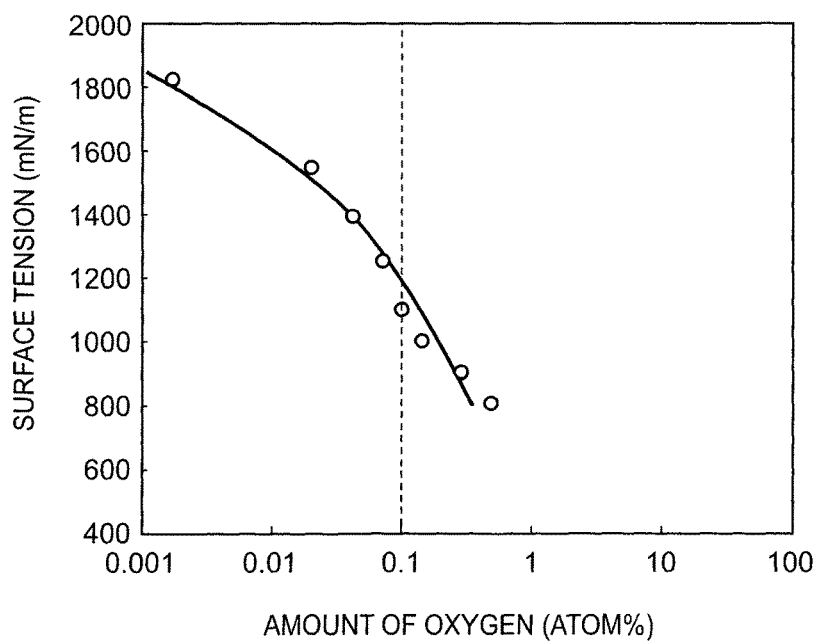
FIG. 8 is a conceptual diagram showing the correlation between the amount of oxygen added to iron and the surface tension.

In addition, as shown in FIG. 8, the surface tension of the droplets is decreased as the amount of oxygen added to iron is increased. Thus in the embodiment, use of inert gas can increase the surface tension of the droplets departed and flying from a solution.

As described above, the droplets of the molten first wire for spraying have increased viscosity as well as have increased surface tension when the droplets are departed and flying from a solution. Therefore the droplets which are coarser than conventional droplets can stably fly from the first wire for spraying towards the substrate under an environment where it is difficult to oxidize the droplets. As a result, the droplets having an increased amount of heat as a part of the iron sprayed coating are allowed to collide with the substrate. Accordingly the physical adsorption between the substrate and the iron sprayed coating can be increased and the rate of the metallic attachment therebetween can be also increased, and moreover the adhesiveness of the iron sprayed coating to the substrate can also be increased.

A first wire for spraying containing less than 0.03% by mass of carbon cannot have sufficient strength, while a first wire for spraying containing more than 0.10% by mass of carbon may have insufficient viscosity, causing collision of fine droplets as a part of an iron sprayed coating to the substrate and resulting in an insufficient adhesion strength.

The second iron sprayed coating 25 is then formed on the first iron sprayed coating 24. Specifically, the second iron sprayed coating 25 is formed on the first iron sprayed coating 24 with the wire for arc spraying W which is the second wire for spraying containing iron and 0.03 to 0.10% by mass of carbon with respect to 100% by mass of the second wire and compressed gas which contains 10 to 21% by volume of oxygen gas. When the first wire for spraying and the second wire for spraying are the same, the second iron sprayed coating 25 can be continuously formed after formation of the first iron sprayed coating 24.

The oxygen-containing gas is adjusted to contain oxygen gas within the range described above in inert gas by, as described above, adjusting the amount of the opening of the valve 76 while measuring the flow rate with the flowmeter 77.

Use of the compressed gas which contains 10 to 21% by volume of oxygen gas allows a decrease in surface tension of the droplets (droplets of the molten second wire for spraying) departed and flying from a solution compared to that of the droplets obtained with compressed gas which is inert gas. As a result the size of the droplets can be decreased while oxidation of some of the droplets can be facilitated. The obtained second iron sprayed coating 25 can be an iron sprayed coating formed with fine particles containing a higher amount of oxides than the first iron sprayed coating 24, thereby resulting in the iron sprayed coating having increased sliding properties compared to the case where only the first iron sprayed coating 24 is included.

A second wire for spraying 25 containing less than 0.03% by mass of carbon cannot have sufficient strength, while the second wire for spraying 25 containing more than 0.10% by mass of carbon may inhibit machinability of the coating because of the high amount of carbon. In addition, compressed gas containing less than 10% by volume of oxygen gas may not provide a sufficient amount of oxides to an iron sprayed coating, and even if compressed gas contains more than 20% by volume of oxygen gas, extra effects of providing more improvements may not be expected.

The first iron sprayed coating 24 is formed with, as described above, coarse droplets and thus has a surface roughness that is greater than the conventional iron sprayed coatings and general undercoated surfaces. Thus even when some droplets of the molten second wire for spraying are oxidized, the adhesion strength of the second iron sprayed coating 25 can be secured due to the anchor effect resulting from the surface roughness of the first iron sprayed coating 24.

The second wire for spraying is further allowed to contain 0.8 to 2.2% by mass of manganese and 0.9 to 1.5% by mass of silicon, and the second iron sprayed coating 25 is formed while supplying the compressed gas so that the droplets of the molten second wire for spraying has a flying speed of 70 m/sec or more.

When the second iron sprayed coating 25 is formed under the conditions, the second iron sprayed coating 25 contains nano-sized (particle diameter: 10 to 200 nm) oxide spheres containing manganese and silicon. As a result, because of the nano-sized oxide spheres therein, the second iron sprayed coating 25 may exhibit further improved scuffing resistance and wear resistance in comparison with an iron sprayed coating that contains iron oxide for the purpose of improving scuffing resistance and wear resistance.

Examples pertaining to the invention are hereinafter described.

<Coating A>

An inner surface of a cylinder bore of a cylinder block (substrate) which was an aluminium casting (JIS: ADC12) having an inner diameter of 82 mm was subjected to pre-treatment (roughening treatment) with a water jet under the condition of spraying pressure of 300 MPa in order to obtain the surface roughness (centre line average roughness Ra) of 5 μm prior to formation of an iron sprayed coating.

Subsequently wires for arc spraying (Fe-0.03 C-0.9 Si-1.4 Mn) containing 0.03% by mass of carbon, 0.9% by mass of silicon and 1.4% by mass of manganese with the balance being iron and unavoidable impurities were melted by means of an electric arc with a (two-wire) spraying device shown in FIG. 5. At the same time, the molten wires for arc spraying were sprayed onto the substrate while supplying compressed gas which was inert gas (nitrogen gas: 99.9% by volume) to the molten wires to form an iron sprayed coating on the substrate with the droplets of the molten wires for arc spraying. Accordingly the member coated with the iron sprayed coating was prepared.

The conditions for formation of the coating were: a wire supplying speed during spraying: 100 mm/sec; a wire diameter: φ 1.6 mm; applied voltage: 30 V and current: 280 A for electric arc; speed of descending/ascending of the spraying gun: 8 mm/sec; rotation speed of the spraying gun: 300 rpm; and atomization gas flow rate: 700 L/min. Spraying with the spraying gun was carried out with 2 passages (1 cycle of back and forth) so as to obtain the thickness of the iron sprayed coating of 0.5 mm.

<Coating B>

A member coated with an iron sprayed coating was prepared in the same manner as the coating A except that the wires for arc spraying used were wires for arc spraying (Fe-0.06 C-1.0 Si-1.3 Mn) containing 0.06% by mass of carbon, 1.0% by mass of silicon and 1.3% by mass of manganese with the balance being iron and unavoidable impurities.

<Coating C>

A member coated with an iron sprayed coating was prepared in the same manner as the coating A except that the wires for arc spraying used were wires for arc spraying (Fe-0.1 C-1.2 Si-0.8 Mn) containing 0.1% by mass of carbon, 1.2% by mass of silicon and 0.8% by mass of manganese with the balance being iron and unavoidable impurities.

<Coating a>

A member coated with an iron sprayed coating was prepared in the same manner as the coating A except that the wires for arc spraying used were wires for arc spraying (Fe-0.12 C-1.0 Si-1.3 Mn) containing 0.12% by mass of carbon, 1.0% by mass of silicon and 1.3% by mass of manganese with the balance being iron and unavoidable impurities.

<Coating b>

A member coated with an iron sprayed coating was prepared in the same manner as the coating A except that the wires for arc spraying used were wires for arc spraying (Fe-0.2 C-0.9 Si-1.4 Mn) containing 0.2% by mass of carbon, 0.9% by mass of silicon and 1.4% by mass of manganese with the balance being iron and unavoidable impurities.

<Coating c>

A member coated with an iron sprayed coating was prepared in the same manner as the coating A except that the wires for arc spraying used were wires for arc spraying (Fe-0.3 C-0.8 Si-1.3 Mn) containing 0.3% by mass of carbon, 0.8% by mass of silicon and 1.3% by mass of manganese with the balance being iron and unavoidable impurities.

<Coating d>

A member coated with an iron sprayed coating was prepared in the same manner as the coating A except that the wires for arc spraying used were wires for arc spraying (Fe-0.8 C-0.7 Si-1.0 Mn) containing 0.8% by mass of carbon, 0.7% by mass of silicon and 1.0% by mass of manganese with the balance being iron and unavoidable impurities.

<Coatings e to k>

Members coated with iron sprayed coatings according to coating e to coating k which respectively correspond to Comparative Examples in relation to coatings A to C and coatings a to d were prepared in the same manners as coatings A to C and coatings a to d except that the iron sprayed coatings were formed on the substrates with the droplets of the molten wires for arc spraying by spraying the molten wires for arc spraying onto the substrates while supplying compressed gas which was air (oxygen gas: 21% by volume, nitrogen gas: the balance).

<Coatings l and m>

The coating l corresponds to a member coated with an iron sprayed coating including an iron sprayed coating formed according to the method disclosed in JP 2009-155720 A and the coating m corresponds to a member coated with an iron sprayed coating including an iron sprayed coating formed according to the method disclosed in DE 10 2008 053642. The coating l differs from the coating A in that the iron sprayed coating was formed with a material for spraying having a carbon content of 1.5% by mass under an atmosphere containing oxygen gas. The coating m differs from the coating A in that a material for spraying having a carbon content of 0.9% by mass was used.

[Microscopy]

Figure 11A:
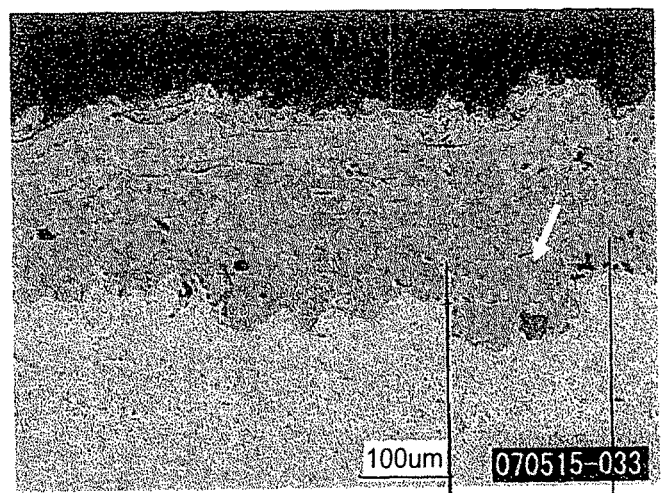
FIG. 11A is a photograph of the tissue of the iron sprayed coating according to the coating B.
Figure 11B:
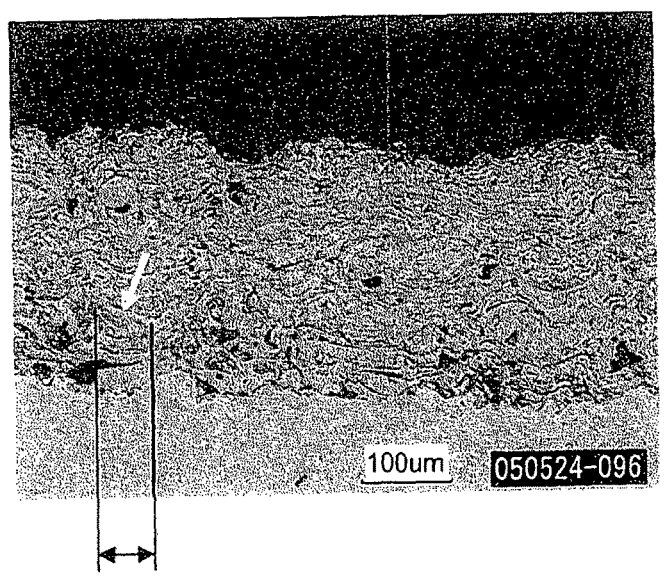
FIG. 11B is a photograph of the tissue of the iron sprayed coating according to the coating f.
Figure 12A:
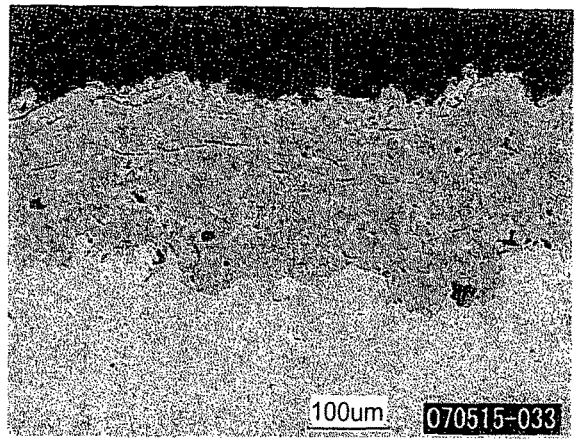
FIG. 12A is a photograph of the tissue of the iron sprayed coating according to the coating B.
Figure 12B:
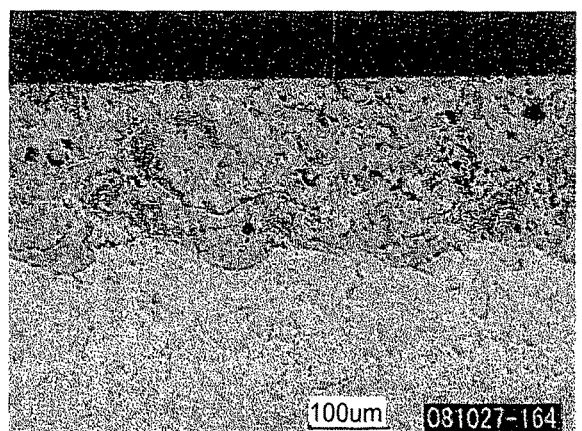
FIG. 12B is a photograph of the tissue of the iron sprayed coating according to the coating l.
Figure 12C:
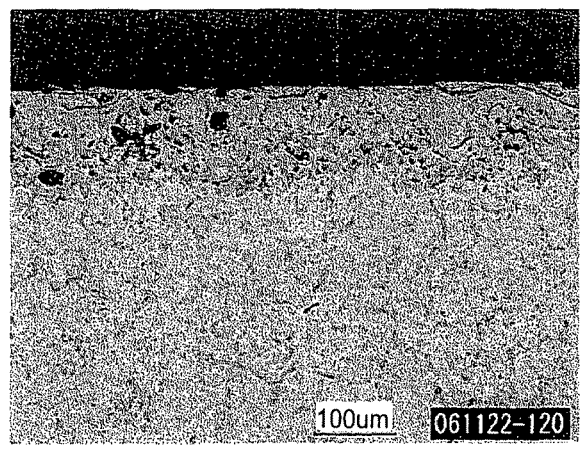
FIG. 12C is a photograph of the tissue of the iron sprayed coating according to the coating m.

The sectional tissues of the upper portions (the sites which were less less susceptible to the effect of dust because dust was aspirated from the bottom) where spraying was initiated on the inner surfaces of the bores having iron sprayed coatings of the coatings A to C and coatings e to m were observed under an optical microscope. Representative results thereof are shown in FIGS. 11A, 11B and 12A to 12C. FIG. 11A is a photograph of the tissue of the iron sprayed coating according to the coating B and FIG. 11B is a photograph of the tissue of the iron sprayed coating according to the coating f. FIG. 12A is a photograph of the tissue of the iron sprayed coating according to the coating B, FIG. 12B is a photograph of the tissue of the iron sprayed coating according to the coating l and FIG. 12C is a photograph of the tissue of the iron sprayed coating according to the coating m.

[Measurement of Particle Diameter]

Figure 9:
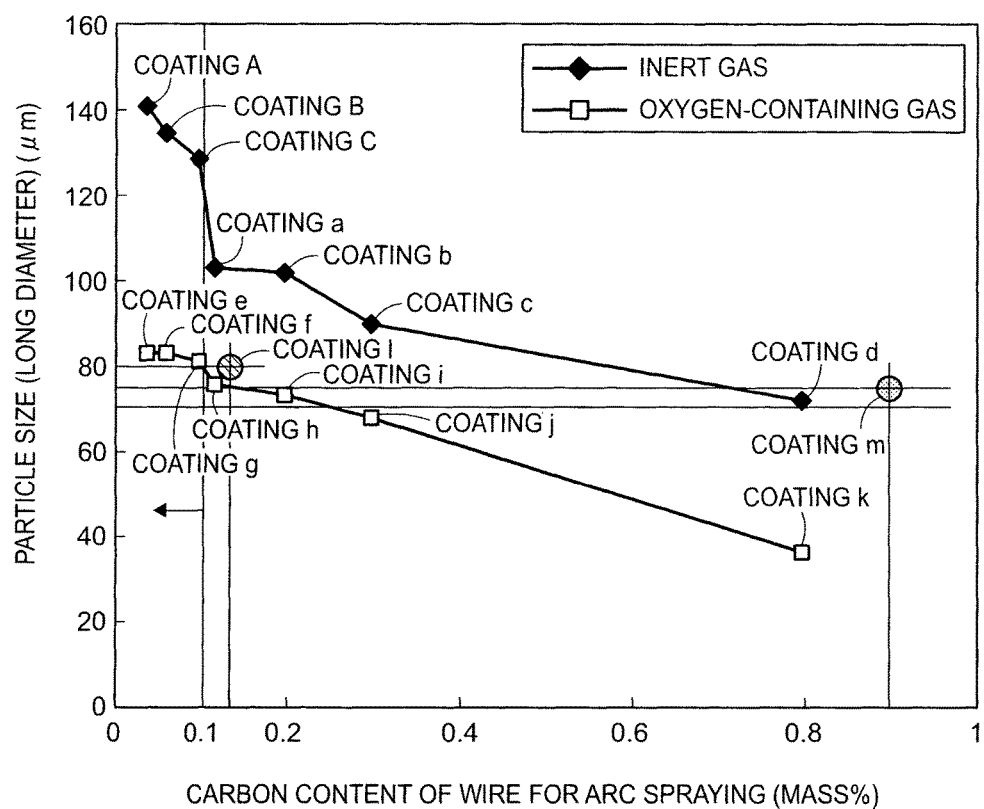
FIG. 9 is a graph showing the correlation between the carbon content of the wires for arc spraying according to the coatings A to C and coatings a to m and the particle diameter of the iron sprayed coatings obtained with the wires.

According to JIS Z8827-1, the particle size of the iron sprayed coatings of the coatings A to C and coatings a to k was measured. Specifically, the microscopic images were enlarged and superimposed with a transparent sheet onto which grain boundaries of the sprayed particles were drawn. The photographs of the drawn grain boundaries were subjected to image processing to determine the particle size. The particle size as used herein is the maximum Feret diameter according to JIS Z8827-1 which corresponds to the average (about 100 points of sampling) of the long diameters (maximum diameters) of flattened particles. The results are shown in FIG. 9 and Table 1. FIG. 9 is a graph showing the correlation between the carbon content of the wires for arc spraying according to the coatings A to C and coatings a to m and the particle diameter of the iron sprayed coatings obtained with the wires.

TABLE 1

|  | Compressed gas | Wire carbon content (mass %) | Particle diameter (μm) |
| --- | --- | --- | --- |
| Coating A | Inert gas | 0.03 | 141 |
| Coating B | Inert gas | 0.06 | 135 |
| Coating C | Inert gas | 0.10 | 129 |
| Coating a | Inert gas | 0.12 | 103 |
| Coating b | Inert gas | 0.20 | 102 |
| Coating c | Inert gas | 0.30 | 90 |
| Coating d | Inert gas | 0.80 | 72 |
| Coating e | Oxygen-containing gas | 0.03 | 83 |
| Coating f | Oxygen-containing gas | 0.06 | 83 |
| Coating g | Oxygen-containing gas | 0.10 | 81 |
| Coating h | Oxygen-containing gas | 0.12 | 76 |
| Coating i | Oxygen-containing gas | 0.20 | 73 |
| Coating j | Oxygen-containing gas | 0.30 | 68 |
| Coating k | Oxygen-containing gas | 0.80 | 36 |

[Measurement of Adhesion Strength]

Figure 10:
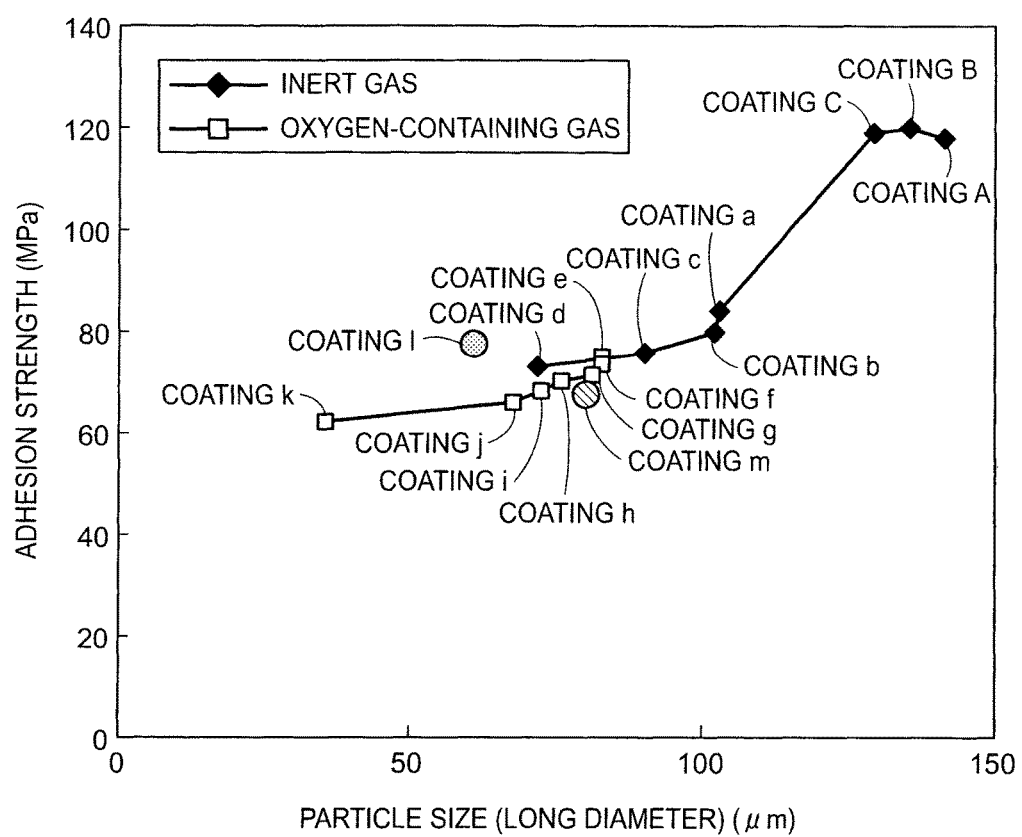
FIG. 10 is a graph showing the correlation between the particle diameter and the adhesion strength according to the coatings A to C and coatings a to m.

Adhesion test specimens were excised from the members coated with iron sprayed coatings of the coatings A to C and coatings a to k in order to measure the iron sprayed coatings for adhesion strength by scratch test. The results are shown in Table 2 and FIG. 10. FIG. 10 is a graph showing the correlation between the particle diameter and the adhesion strength according to the coatings A to C and coatings a to m.

TABLE 2

|  | Compressed gas | Wire carbon content (mass %) | Adhesion strength (MPa) |
| --- | --- | --- | --- |
| Coating A | Inert gas | 0.03 | 118 |
| Coating B | Inert gas | 0.06 | 120 |
| Coating C | Inert gas | 0.10 | 119 |
| Coating a | Inert gas | 0.12 | 84 |
| Coating b | Inert gas | 0.20 | 80 |
| Coating c | Inert gas | 0.30 | 76 |

TABLE 2-continued

|  | Compressed gas | Wire carbon content (mass %) | Adhesion strength (MPa) |
|---|---|---|---|
| Coating d | Inert gas | 0.80 | 73 |
| Coating e | Oxygen-containing gas | 0.03 | 75 |
| Coating f | Oxygen-containing gas | 0.06 | 73 |
| Coating g | Oxygen-containing gas | 0.10 | 71 |
| Coating h | Oxygen-containing gas | 0.12 | 70 |
| Coating i | Oxygen-containing gas | 0.20 | 68 |
| Coating j | Oxygen-containing gas | 0.30 | 66 |
| Coating k | Oxygen-containing gas | 0.80 | 62 |

[Observation of Surface Tissues]

Figure 13:
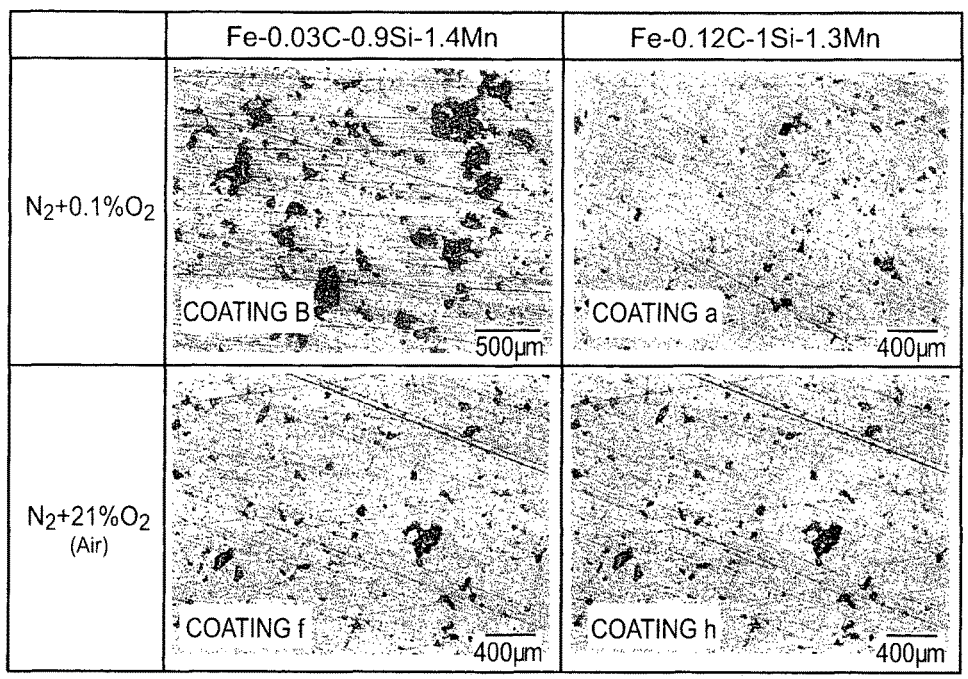
FIG. 13 is photographs of surface tissues of the iron sprayed coatings according to the coatings B, a, f and h.

The surfaces of iron sprayed coatings of the members coated with the iron sprayed coatings according to the coatings B, a, f and h were subjected to cutting by boring as well as honing (rough finishing, semi-finishing and Plateau finishing) and the surface of the iron sprayed coatings were evaluated for production of pits. Representative results thereof are shown in FIG. 13. FIG. 13 is photographs of surface tissues of the iron sprayed coatings according to the coatings B, a, f and h.

[Friction and Wear Test and Hardness Test]

Test block pieces were excised from the members coated with the iron sprayed coatings of the coatings A to C and coatings a, b and d, the hardness of the surface of the iron sprayed coatings was measured and then the coefficient of friction and the wear amount were measured by the LFW friction test (Block on Ring test). The results are shown in FIG. 14.

Figure 14:
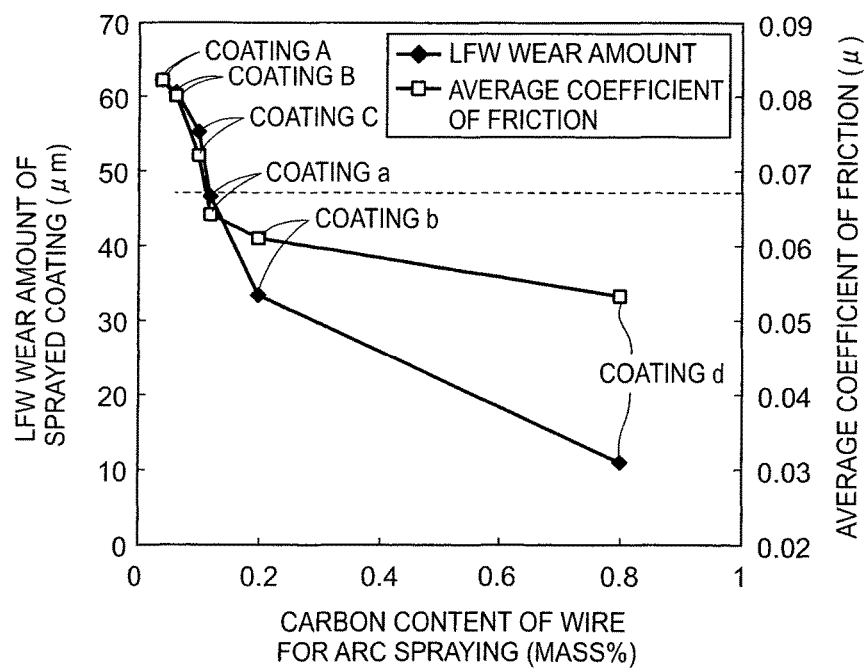
FIG. 14 is a graph showing the correlation between the carbon content of the wires for arc spraying according to the coatings A to C and coatings a, b and d and the LFW wear amount of the iron sprayed coatings formed under the conditions, and the correlation between the carbon content of the wires for arc spraying and the average coefficient of friction of the iron sprayed coatings formed under the conditions.
Figure 15:
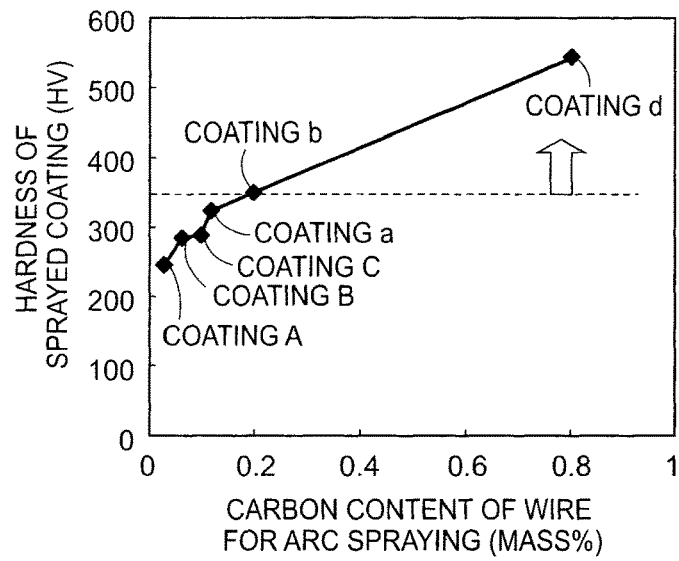
FIG. 15 is a graph showing the correlation between the carbon content of the wires for arc spraying according to the coatings A to C and coatings a, b and d and the hardness of the iron sprayed coatings formed with the wires.

FIG. 14 is a graph showing the correlation between the carbon content of the wires for arc spraying according to the coatings A to C and coatings a, b and d and the LFW wear amount of the iron sprayed coatings formed under the conditions, and the correlation between the carbon content of the wires for arc spraying and the average coefficient of friction of the iron sprayed coatings formed under the conditions. FIG. 15 is a graph showing the correlation between the carbon content of the wires for arc spraying according to the coatings A to C and coatings a, b and d and the hardness of the iron sprayed coatings formed with the wires.

[Results for Carbon Content]

The carbon content of the iron sprayed coatings of the coatings A to C and coatings a to k was measured by X-ray spectroscopy. The results are shown in Table 3 below.

TABLE 3

|  | Compressed gas | Wire carbon content (mass %) | Coating carbon content (mass %) |
|---|---|---|---|
| Coating A | Inert gas | 0.03 | 0.015 |
| Coating B | Inert gas | 0.06 | 0.035 |
| Coating C | Inert gas | 0.10 | 0.063 |
| Coating a | Inert gas | 0.12 | 0.074 |
| Coating b | Inert gas | 0.20 | 0.080 |
| Coating c | Inert gas | 0.30 | 0.179 |
| Coating d | Inert gas | 0.80 | 0.500 |
| Coating e | Oxygen-containing gas | 0.03 | 0.008 |
| Coating f | Oxygen-containing gas | 0.06 | 0.035 |
| Coating g | Oxygen-containing gas | 0.10 | 0.070 |
| Coating h | Oxygen-containing gas | 0.12 | 0.090 |
| Coating i | Oxygen-containing gas | 0.20 | 0.163 |
| Coating j | Oxygen-containing gas | 0.30 | 0.254 |
| Coating k | Oxygen-containing gas | 0.80 | 0.709 |

[Result 1 and Discussion 1]

As shown in FIGS. 9, 11A, 11B and 12A to 12C, the size of the particles forming the iron sprayed coatings was increased when the wires for arc spraying had decreased carbon contents, and the size of the particles forming the iron sprayed coatings was increased when inert gas was used compared to the case when oxygen-containing gas was used. As shown in FIG. 10, the adhesion strength of the iron sprayed coatings according to the coatings A to C was higher than that of the coatings a to m and was comparable to the shear stress at failure of the substrate (ADC12).

Namely, it is believed that even when the iron sprayed coatings according to the coatings A to C are subjected to machining or local stress is applied thereto during use, the iron sprayed coatings and the substrates are united and thus the iron sprayed coatings are difficult to be detached from the substrates.

Particularly it is believed that by defining the carbon content of the wires for arc spraying to 0.03 to 0.1% by mass as in the coatings A to C the droplets of the molten wires for spraying had increased viscosity and by using inert gas oxidation of the molten droplets was suppressed when the droplets were departed and flying from the solution, resulting in an increase in the surface tension of the droplets.

Accordingly it is believed that coarse droplets stably flew from the wires for spraying towards the substrate under a less oxidizing environment in the case of the coatings A to C compared to the case of the coatings a to k. As a result, the droplets having an increased amount of heat as a part of the iron sprayed coatings can be allowed to collide with the substrates. Accordingly it is believed that the physical adsorption between the substrates and the iron sprayed coatings could be increased as well as the rate of the metallic attachment therebetween could be also increased, thereby increasing the adhesiveness of the iron sprayed coatings to the substrates. Moreover, as shown in Table 1, it is believed that the iron sprayed coatings of the coatings A to C had carbon contents of 0.07% by mass or less, and thus the iron sprayed coatings had preferable machinability.

Figure 16:
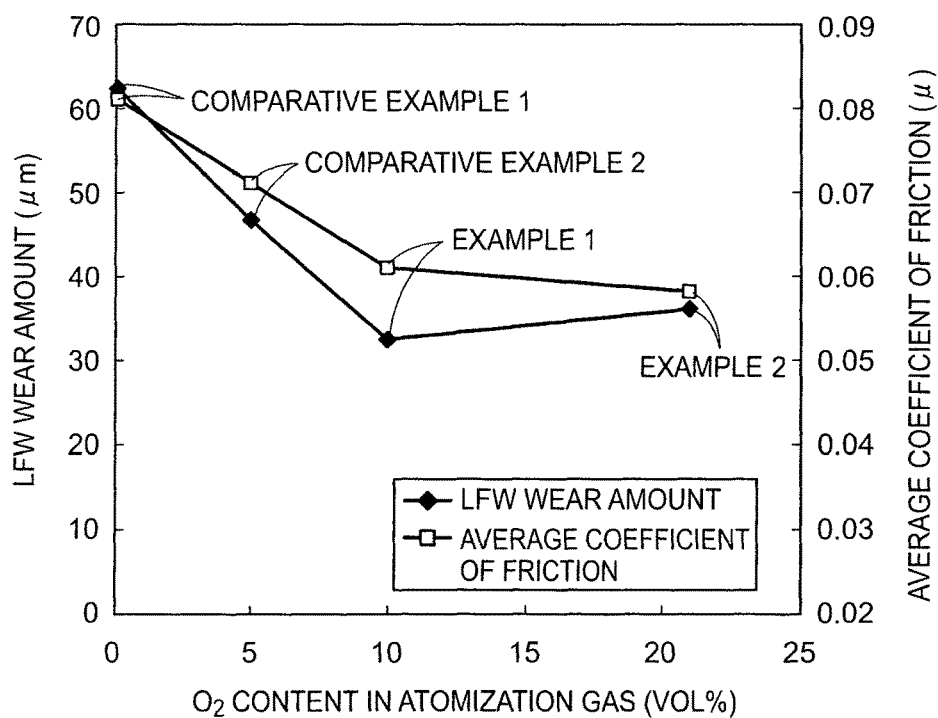
FIG. 16 is a graph showing the correlation between the oxygen content in atomization gases according to Examples 1 and 2 and Comparative Examples 1 and 2 and the LFW wear amount of the iron sprayed coatings formed under the conditions, and the correlation between the oxygen content in atomization gases and the average coefficient of friction of the iron sprayed coatings formed under the conditions.
Figure 17:
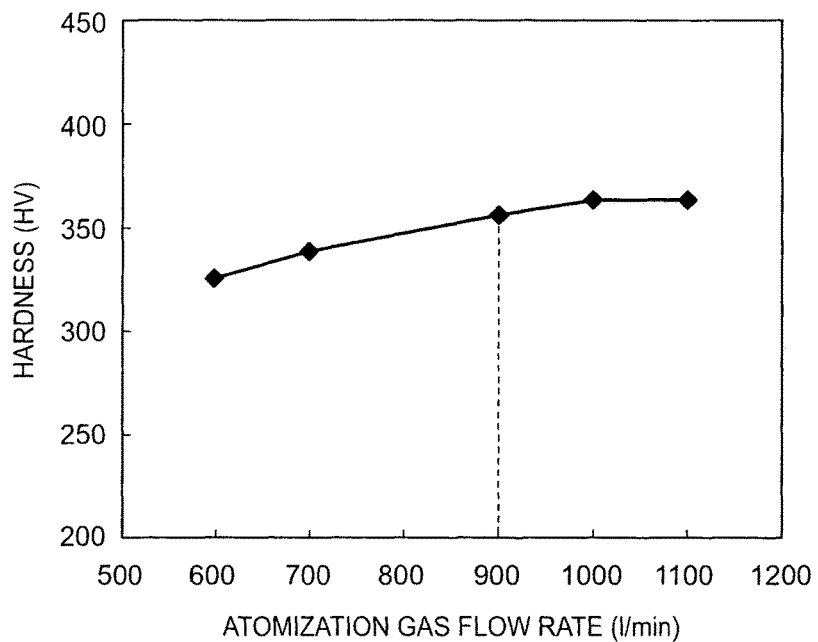
FIG. 17 is a graph showing the correlation between the atomization gas flow rate during formation of the coatings according to Example 3 and the hardness of the iron sprayed coatings formed with the flow rates.

However, as shown in FIG. 13, the coating B had larger surface pits and exhibited lower surface hardness of the iron sprayed coating than other coatings because the coating was formed by collision of coarse droplets as described above. Accordingly as shown in FIGS. 16 and 17, when wear resistance and reduction in the coefficient of friction are required, it is preferable to form a first iron sprayed coating which is an iron sprayed coating according to any of coatings A to C as an underlayer (intermediate layer) and form a second iron sprayed coating having wear resistance thereon.

Examples for formation of a first iron sprayed coating and a second iron sprayed coating thereon are described hereinbelow.

Example 1

A member coated with an iron sprayed coating of Example 1 was prepared in the same manner as the coating A except that the first iron sprayed coating which was the iron sprayed coating of the coating A was formed with the moving speed of 16 mm/sec and then an iron sprayed coating was similarly formed using a gas supply device shown in FIG. 6 in order to supply oxygen gas-containing gas to the spraying device.

The conditions for formation of the second iron sprayed coating were: a wire supplying speed during spraying: 100 mm/sec; a wire diameter: ϕ 1.6 mm; applied voltage: 30 V and current: 280 A for electric arc; speed of descending/ascending of the spraying gun: 5.4 mm/sec; rotation speed of the spraying gun: 300 rpm; atomization gas flow rate 700 L/min; and compressed gas:nitrogen gas containing 10% by volume of oxygen. The iron sprayed coating of the sprayed coating-coated member was then subjected to cutting by boring and honing (rough finishing, semi-finishing and Plateau finishing).

Example 2

A member coated with an iron sprayed coating of Example 2 was prepared as Example 1 except that the compressed gas used was nitrogen gas containing 21% by volume of oxygen.

Comparative Example 1

A member coated with an iron sprayed coating of Comparative Example 1 was prepared as Example 1 except that the compressed gas used was nitrogen gas containing 0.1% by volume of oxygen.

Comparative Example 2

A member coated with an iron sprayed coating of Comparative Example 2 was prepared as Example 1 except that the compressed gas used was nitrogen gas containing 5% by volume of oxygen.

The members coated with the iron sprayed coatings according to Examples 1 and 2 and Comparative Examples 1 and 2 were subjected to the friction and wear test as the coating A. The results are shown in FIG. 16. FIG. 16 is a graph showing the correlation between the oxygen content in atomization gases according to Examples 1 and 2 and Comparative Examples 1 and 2 and the LFW wear amount of the iron sprayed coatings formed under the conditions, and the correlation between the oxygen content in atomization gases and the average coefficient of friction of the iron sprayed coatings formed under the conditions.

[Result 2 and Discussion 2]

As shown in FIG. 16, Examples 1 and 2 in which the second iron sprayed coatings were formed on the first iron sprayed coatings using the compressed gas containing 10 to 21% by volume of oxygen gas had improved wear resistance and decreased coefficient of friction compared to Comparative Examples 1 and 2. It is believed that use of gas containing oxygen gas at the content described above allowed decreased surface tension of the droplets (droplets of the molten second wire for spraying) departed and flying from a solution compared to use of compressed gas which was inert gas. Accordingly it is believed that the size of the droplets could be decreased while oxidation of some of the molten droplets could be facilitated. As a result, the obtained second iron sprayed coating can be the iron sprayed coating formed with fine particles containing a higher amount of oxides than the first iron sprayed coating, thereby resulting in the iron sprayed coatings having increased sliding properties compared to Comparative Examples 1 and 2.

Example 3

Members coated with iron sprayed coatings of Example 3 were prepared in the same manner as Example 1 except that the atomization gas flow rate was 600 L/min, 700 L/min, 900 L/min, 1000 L/min or 1100 L/min. The iron sprayed coatings of the members coated with the iron sprayed coatings were subjected to the hardness test and the friction and wear test as the coating A was subjected those test, and moreover the coatings were also subjected to the scuffing resistance test (the time before generation of scuffing) in order to evaluate seizure resistance properties. The flying speed of the droplets depending on the atomization gas flow rate was measured with a Spray Watch from Osier. The iron sprayed coatings were observed by TEM and subjected to elemental analysis by EDX analysis. The results are shown in FIGS. 17 to 22.

Figure 18:
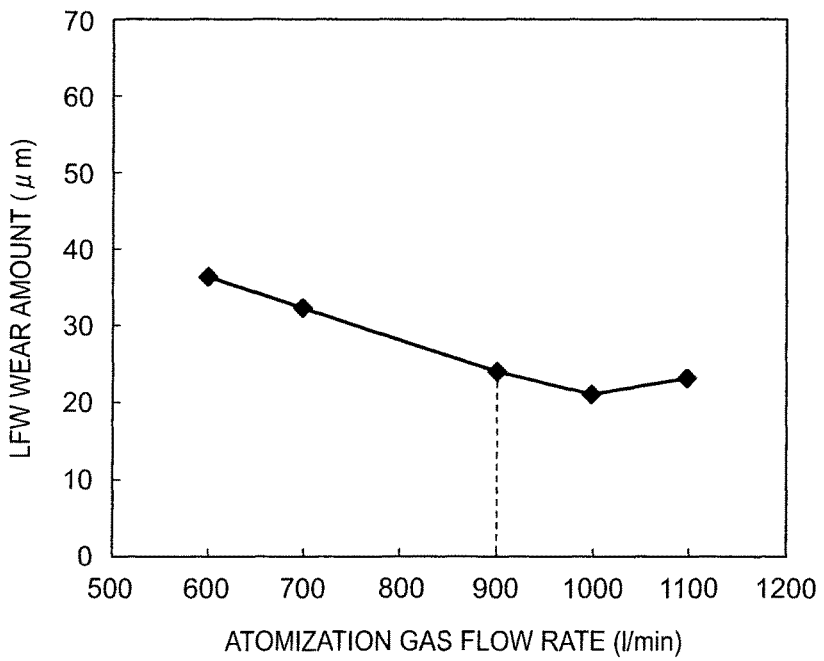
FIG. 18 is a graph showing the correlation between the atomization gas flow rate during formation of the coatings according to Example 3 and the LFW wear amount of the iron sprayed coatings formed with the flow rates.
Figure 19:
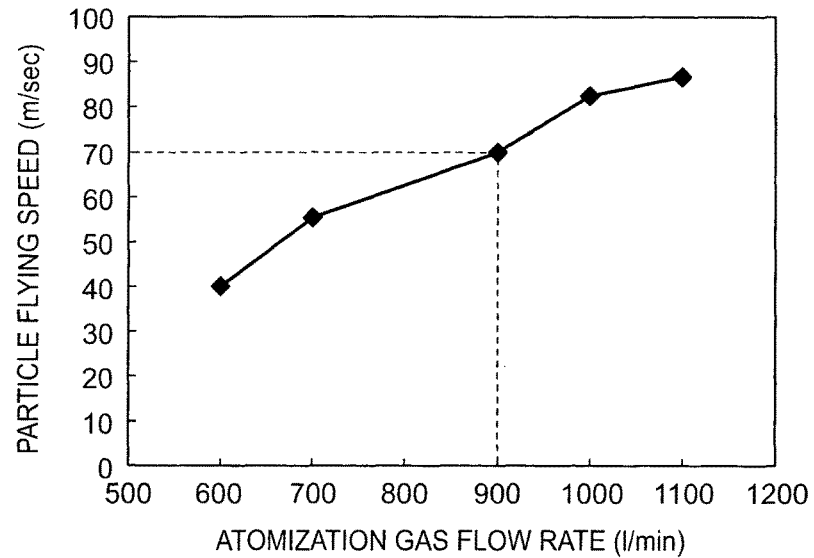
FIG. 19 is a graph showing the correlation between the atomization gas flow rate during formation of the coatings according to Example 3 and the flying speed of particles during formation of the coatings.
Figure 20:
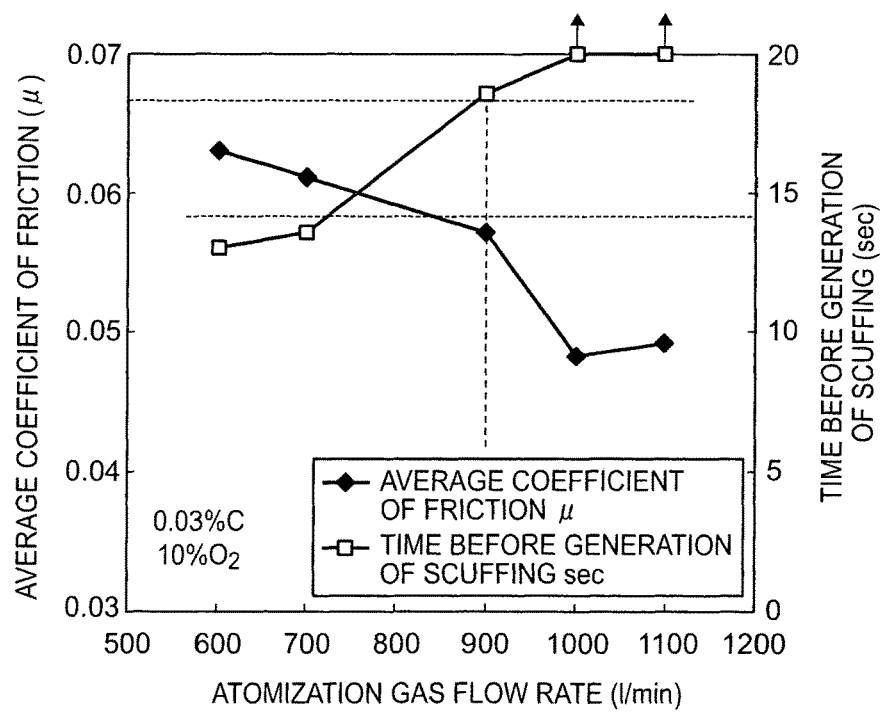
FIG. 20 is a graph showing the correlation between the atomization gas flow rate during formation of the coatings according to Example 3 and the coefficient of friction of the iron sprayed coatings formed with the flow rates, and the correlation between the atomization gas flow rate during formation of the coatings and the time before generation of scuffing of the iron sprayed coatings formed with the flow rates.

FIG. 17 is a graph showing the correlation between the atomization gas flow rate during formation of the coatings according to Example 3 and the hardness of the iron sprayed coatings formed with the flow rates. FIG. 18 is a graph showing the correlation between the atomization gas flow rate during formation of the coatings according to Example 3 and the LFW wear amount of the iron sprayed coatings formed with the flow rates. FIG. 19 is a graph showing the correlation between the atomization gas flow rate during formation of the coatings according to Example 3 and the flying speed of particles during formation of the coatings. FIG. 20 is a graph showing the correlation between the atomization gas flow rate during formation of the coatings according to Example 3 and the coefficient of friction of the iron sprayed coatings formed with the flow rates, and the correlation between the atomization gas flow rate during formation of the coatings and the time before generation of scuffing of the iron sprayed coatings formed with the flow rates.

Figure 21A:
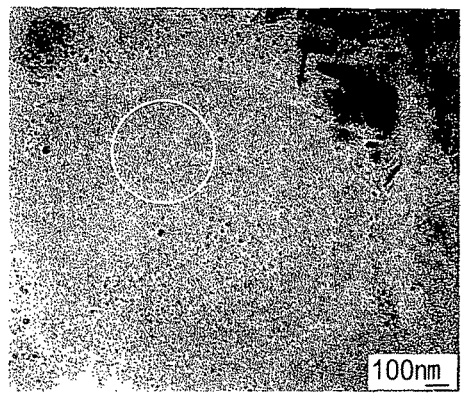
FIGS. 21A and 21B show the results of TEM observation of the coating formed with the atomization gas flow rate of 700 L/min in Example 3.
Figure 21B:
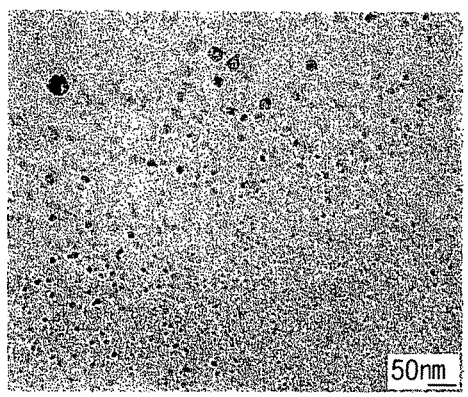
Figure 21C:
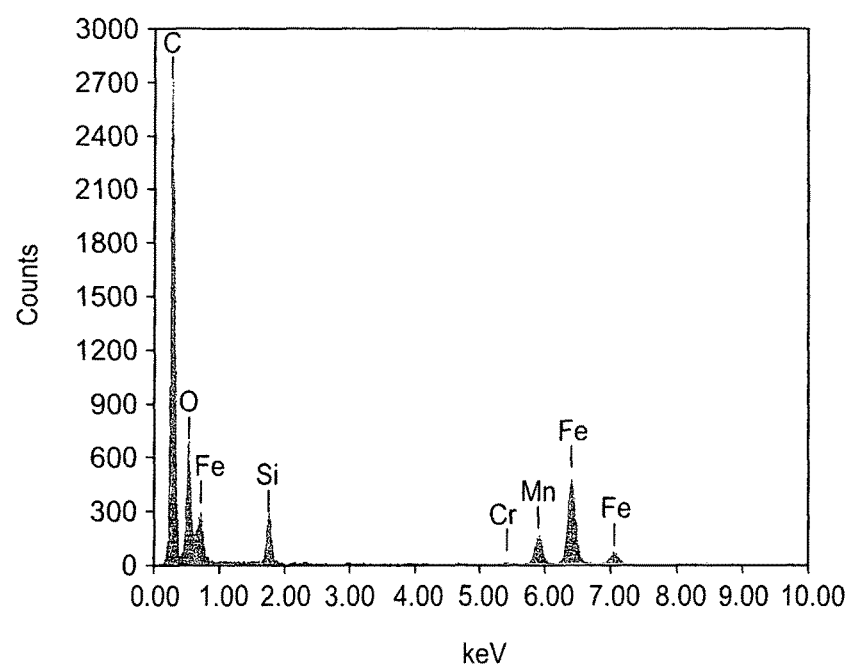
FIG. 21C is a graph showing the result of EDX analysis of the particles in the coating.
Figure 23:
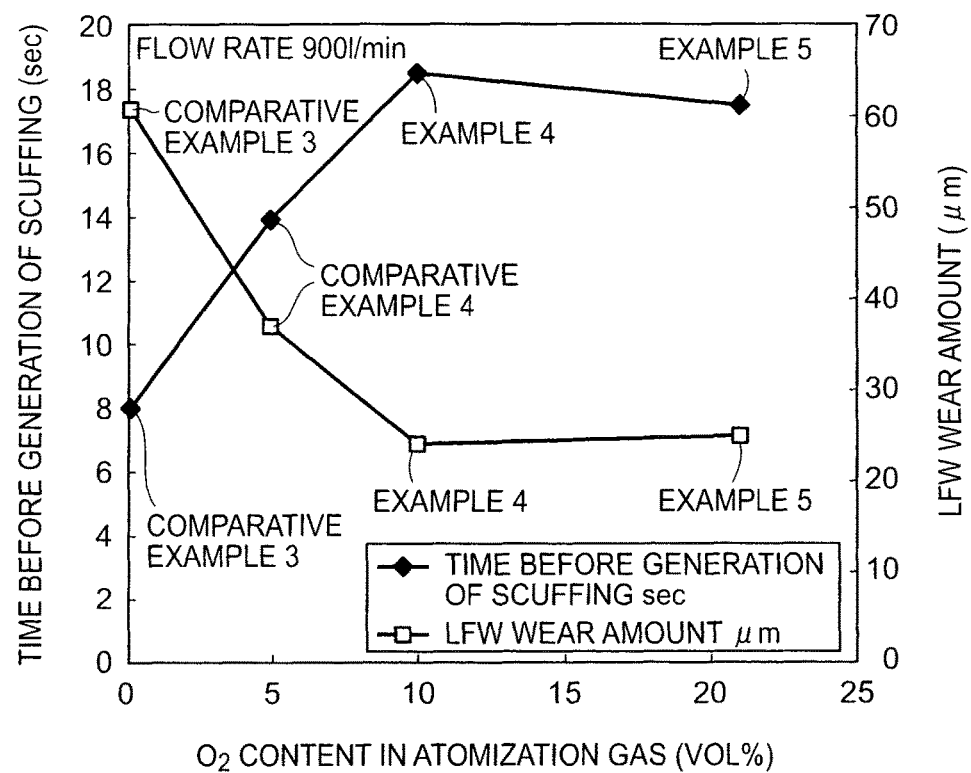
FIG. 23 is a graph showing the correlation between the atomization gas flow rate during formation of the coatings according to Examples 4 and 5 and Comparative Examples 3 and 4 and the LFW wear amount of the iron sprayed coatings formed under the conditions, and the correlation between the atomization gas flow rate during formation of the coatings and the time before generation of scuffing of the iron sprayed coatings formed under the conditions.

Further, FIGS. 21A and 21B are the results of TEM observation of the coating formed with the atomization gas flow rate of 700 L/min in Example 3 and FIGS. 22A and 22B are the results of TEM observation of the coating formed with the atomization gas flow rate of 900 L/min in Example 3. FIGS. 21C and 22C are graphs showing the results of EDX analyses of the particles in the coatings respectively formed under the atomization gas flow rate conditions of 700 L/min and 900 L/min.

[Result 3 and Discussion 3]

FIGS. 17, 18 and 19 show that by forming the second iron sprayed coatings with the atomization gas flow rate of 900 L/m or more, i.e., by supplying compressed gas so that the flying speed of the droplets of the molten second wire for spraying is 70 m/sec or more, the second iron sprayed coatings had increased hardness. As a result not only the LFW wear amount was decreased but also the average coefficient of friction was reduced and the time before generation of scuffing was also extended.

As shown in FIGS. 21A and 21B, the coatings were formed with polygonal particles under the condition of the atomization gas flow rate of 700 L/min (i.e., the flying speed of less than 70 m/sec), while, as shown in FIGS. 22A and 22B, the coatings were formed with spherical nano-particles of about 10 to 200 nm under the condition of the atomization gas flow rate of 900 L/min (i.e., the flying speed of 70 m/sec or more).

As shown in FIG. 21C, the polygonal particles contain iron carbide ($FeC_x$) while, as shown in FIG. 22C, the spherical nano-particles are oxide spheres containing manganese and silicon ($Mn_xSi_yO_z$). When the flying speed of the droplets is 70 m/sec or more, the droplets may include oxygen contained in atomization gas to produce the oxide spheres. It is believed that the nano-sized oxide spheres in the second iron sprayed coating could further improve scuffing resistance and wear resistance.

According to the above experiments by the inventors, the wire for atomization spraying preferably contains manganese in the range of 0.8 to 2.2% by mass and silicon in the range of 0.9 to 1.5% by mass. When the content of manganese is below 0.8% by mass, the iron sprayed coating may have decreased hardness, and when the content is more than 2.2% by mass, the oxide spheres may not be obtained. When the range of silicon is below 0.9% by mass, the oxide spheres may not be obtained, and when the range of silicon is more than 1.5% by mass, the spraying properties may be deteriorated.

Example 4

A member coated with an iron sprayed coating was prepared in the same manner, as Example 1 except that the flow rate of nitrogen gas containing 10% by volume of oxygen was 900 L/min.

Example 5

A member coated with an iron sprayed coating was prepared in the same manner as Example 1 except that nitrogen gas containing 21% by volume of oxygen was used of which flow rate was 900 L/min.

Comparative Example 3

A member coated with an iron sprayed coating was prepared in the same manner as Example 4 except that the compressed gas used was nitrogen gas containing 0.1% by volume of oxygen.

Comparative Example 4

A member coated with an iron sprayed coating was prepared in the same manner as Example 4 except that the compressed gas used was nitrogen gas containing 5% by volume of oxygen.

Table 4 shows conditions of formation of the second iron sprayed coatings of Examples 1 to 5 and Comparative Examples 1 to 4.

TABLE 4

| | Conditions for formation of second iron sprayed coating | |
|---|---|---|
| | Compressed gas | Gas flow rate |
| Example 1 | $N_2$ + 10 vol % $O_2$ | 700 L/min |
| Example 2 | $N_2$ + 21 vol % $O_2$ | 700 L/min |
| Example 3 | $N_2$ + 10 vol % $O_2$ | 600 L/min |
| | | 700 L/min |
| | | 900 L/min |
| | | 1000 L/min |
| | | 1100 L/min |

TABLE 4-continued

| | Conditions for formation of second iron sprayed coating | |
|---|---|---|
| | Compressed gas | Gas flow rate |
| Example 4 | $N_2$ + 10 vol % $O_2$ | 900 L/min |
| Example 5 | $N_2$ + 21 vol % $O_2$ | 900 L/min |
| Comparative Example 1 | $N_2$ + 0.1 vol % $O_2$ | 700 L/min |
| Comparative Example 2 | $N_2$ + 5 vol % $O_2$ | 700 L/min |
| Comparative Example 3 | $N_2$ + 0.1 vol % $O_2$ | 900 L/min |
| Comparative Example 4 | $N_2$ + 5 vol % $O_2$ | 900 L/min |

The iron sprayed coatings of members coated with iron sprayed coatings were subjected to the friction and wear test and the scuffing resistance test (the time before generation of scuffing) in order to evaluate seizure resistance properties of the iron sprayed coatings as Example 3. The results are shown in FIG. 23.

FIG. 23 is a graph showing the correlation between the atomization gas flow rate during formation of the coatings according to Examples 4 and 5 and Comparative Examples 3 and 4 and the LFW wear amounts of the iron sprayed coatings formed under the conditions, and the correlation between the atomization gas flow rate during formation of the coatings and the time before generation of scuffing of the iron sprayed coatings formed under the conditions.

[Result 4 and Discussion 4]

As shown in FIG. 23, it is believed that the iron sprayed coatings according to Examples 4 and 5 had improved wear resistance and scuffing resistance due to nano-sized oxide spheres compared to Comparative Examples 3 and 4.

The embodiments of the invention have been specifically described as above. However, the invention is not limited to the above embodiments and may be variously modified.

For example, although the above Examples pertain to formation of the first and second iron sprayed coatings, only the first iron sprayed coating may be formed at a portion where adhesiveness is predominantly required. A coating that is made of a material different from that of the first iron sprayed coating and is harder than the first iron sprayed coating may be formed thereon. Further, only the second iron sprayed coating may be formed at a portion where wear resistance of the iron sprayed coating with low carbon content is predominantly required.

What is claimed is:

1. A method for forming an iron sprayed coating on a substrate with droplets of a molten wire for arc spraying that are prepared by melting a wire for arc spraying by means of an electric arc and spraying the molten wire on the substrate while supplying compressed gas to the molten wire, comprising:

forming a first iron sprayed coating on the substrate using a first wire containing iron and 0.03 to 0.10% by mass of carbon as the wire for arc spraying and an inert gas as the compressed gas; and forming a second iron sprayed coating on the first iron sprayed coating using a second wire containing iron and 0.03 to 0.10% by mass of carbon as the wire for arc spraying and a gas containing 10 to 21% by volume of oxygen gas as the compressed gas.

2. The coating forming method according to claim 1, wherein the same wire is used as the first wire and the second wire.

3. The coating forming method according to claim 1, wherein the second wire further contains 0.8 to 2.2% by mass of manganese and 0.9 to 1.5% by mass of silicon, and the second iron sprayed coating is formed while supplying the compressed gas so that the droplets of the molten second wire has a flying speed of 70 m/sec or more.

4. The coating forming method according to claim 1, wherein the second iron sprayed coating is a sliding surface.

5. A coated member, comprising:

a substrate;

a first iron sprayed coating formed on the substrate, the first iron sprayed coating including a carbon content of 0.07% by mass or less; and a second iron sprayed coating formed on the first iron sprayed coating, the second iron sprayed coating including a carbon content of 0.07% by mass or less and an oxygen content that is higher than an oxygen content of the first iron sprayed coating, and the second iron sprayed coating whose crystal particle diameter being smaller than a crystal particle diameter of the first iron sprayed coating.

6. The coated member according to claim 5, wherein the second iron sprayed coating contains an oxide sphere containing manganese and silicon.

7. The coating forming method according to claim 6, wherein the second iron sprayed coating contains oxide spheres containing manganese and silicon and the oxide spheres have a particle diameter of 10 to 200 nm.

8. The coating forming method according to claim 5, wherein the second iron sprayed coating is a sliding surface.

9. The coating forming method according to claim 5, wherein the crystal particle diameter of the first iron sprayed coating is 129 µm or more.

10. The coating forming method according to claim 5, wherein the second iron sprayed coating has a higher hardness than the first iron sprayed coating.

* * * * *